(12) United States Patent
Wang et al.

(10) Patent No.: US 12,432,060 B2
(45) Date of Patent: Sep. 30, 2025

(54) METHOD AND SYSTEM TO RETRIEVE PUBLIC KEYS IN A MEMORY CONSTRAINED SYSTEM

(71) Applicant: Continental Automotive Technologies GmbH, Hannover (DE)

(72) Inventors: Yi Estelle Wang, Singapore (SG); Vijayaraj Suriyakumar, Singapore (SG)

(73) Assignee: Continental Automotive Technologies GmbH, Hannover (DE)

( * ) Notice: Subject to any disclaimer, the term of this patent is extended or adjusted under 35 U.S.C. 154(b) by 122 days.

(21) Appl. No.: 18/570,643

(22) PCT Filed: Jun. 3, 2022

(86) PCT No.: PCT/EP2022/065145
§ 371 (c)(1),
(2) Date: Dec. 15, 2023

(87) PCT Pub. No.: WO2022/263204
PCT Pub. Date: Dec. 22, 2022

(65) Prior Publication Data
US 2024/0283644 A1 Aug. 22, 2024

(30) Foreign Application Priority Data
Jun. 15, 2021 (GB) ...................... 2108489

(51) Int. Cl.
*H04L 9/08* (2006.01)
*H04L 9/14* (2006.01)
*H04L 9/30* (2006.01)

(52) U.S. Cl.
CPC .............. *H04L 9/0894* (2013.01); *H04L 9/14* (2013.01); *H04L 9/30* (2013.01)

(58) Field of Classification Search
CPC . H04L 9/0894; H04L 9/00; H04L 9/30; H04L 9/302; H04L 9/14; H04L 2209/84; G06F 21/00
See application file for complete search history.

(56) References Cited

U.S. PATENT DOCUMENTS 7,248,692 B2 7/2007 Seifert
9,674,162 B1* 6/2017 Miller ..................... H04L 63/06
(Continued)

OTHER PUBLICATIONS

On compression of cryptographic keys; 2008 IEEE International Symposium on Information Theory; Aug. 8, 2008; 5 pages.*
(Continued)

*Primary Examiner* — Mohammad A Siddiqi (57) ABSTRACT

Retrieving public keys in a memory constrained system is performed by generating a plurality of public cryptographic keys and private cryptographic keys using a cryptographic technique and characterizing each of the plurality of public cryptographic keys and corresponding private cryptographic keys into an associated first cryptographic component and a second cryptographic component. At least one relationship matrix, including the first cryptographic component of each of the plurality of public cryptographic keys and corresponding private cryptographic keys, is created based on predetermined rules. Subsequently, a first cryptographic component and a second cryptographic component of a private cryptographic key are received when a public cryptographic key is required, and the public cryptographic key is retrieved based on the first cryptographic component and the second cryptographic component of the private cryptographic key using the relationship matrix and the predetermined rules.

14 Claims, 6 Drawing Sheets

(56) References Cited

U.S. PATENT DOCUMENTS

| | | | |
|---|---|---|---|
| 10,423,691 B1* | 9/2019 | Patel | G06F 16/9566 |
| 10,728,043 B2* | 7/2020 | Moses | H04L 9/083 |
| 2012/0263296 A1* | 10/2012 | Belenky | H04L 9/0869 |
| | | | 380/44 |
| 2014/0282360 A1* | 9/2014 | Beardslee | G06F 8/20 |
| | | | 717/104 |
| 2017/0111177 A1* | 4/2017 | Oguma | H04L 9/3273 |
| 2018/0007547 A1* | 1/2018 | Scholten | H04W 12/04 |
| 2018/0158328 A1* | 6/2018 | Benhammou | G08G 1/04 |
| 2019/0028448 A1* | 1/2019 | Farrell | H04L 63/062 |
| 2019/0215163 A1* | 7/2019 | Suleiman | G07C 9/00309 |
| 2023/0082163 A1* | 3/2023 | Leise | G07C 5/006 |
| | | | 713/150 |
| 2023/0327883 A1* | 10/2023 | Ansari | G06F 21/57 |
| | | | 713/2 |

OTHER PUBLICATIONS

Intellectual Property Office Search Report dated Mar. 8, 2022 for the priority GB Patent Application No. 2108489.2.
The International Search Report and the Written Opinion of the International Searching Authority mailed on Sep. 15, 2022 for the PCT Application No. PCT/ which this application claims priority.
Programming Praxis, The Next Prime, Mar. 26, 2010, https://programmingpraxis.com/2010/03/26/the-next-prime/.

* cited by examiner

Figure 1a

| Public cryptographic key | k's value (first cryptographic component) | Reminder value (second cryptographic component) |
|---|---|---|
| 761 | 25 | 11 |

Figure 1b

| m | Public cryptographic key value | kpub (first cryptographic component) | Rpub (second cryptographic component) | Private cryptographic key value | kpriv (first cryptographic component) | Rpriv (second cryptographic component) |
|---|---|---|---|---|---|---|
| 2 | 79 | 3 | -11 | 79 | 3 | -11 |
| 3 | 11 | 0 | 11 | 851 | 28 | 11 |
| 3 | 23 | 1 | -7 | 407 | 14 | -13 |
| 3 | 37 | 1 | 7 | 253 | 8 | 13 |
| 4 | 7 | 0 | 7 | 1783 | 59 | 13 |
| 4 | 1783 | 59 | 13 | 7 | 0 | 7 |
| 6 | 97 | 3 | 7 | 193 | 6 | 13 |
| 6 | 193 | 6 | 13 | 97 | 3 | 7 |
| 8 | 109 | 4 | -11 | 229 | 8 | -11 |
| 8 | 229 | 8 | -11 | 109 | 4 | -11 |
| 10 | 41 | 1 | 11 | 761 | 25 | 11 |
| 10 | 761 | 25 | 11 | 41 | 1 | 11 |
| ... | ... | ... | ... | ... | ... | ... |
| 17 | 59 | 2 | -1 | 1829 | 61 | -1 |
| ... | ... | ... | ... | ... | ... | ... |

Figure 1c

| m | kpub (first cryptographic component) | kpriv (first cryptographic component) |
|---|---|---|
| 3 | 0 | 28 |
| 10 | 1 | 25 |
| 10 | 25 | 1 |
| 18 | 2 | 26 |
| 31 | 10 | 10 |
| 46 | 3 | 47 |
| 71 | 4 | 56 |
| ... | ... | ... |

METHOD AND SYSTEM TO RETRIEVE PUBLIC KEYS IN A MEMORY CONSTRAINED SYSTEM

CROSS-REFERENCE TO RELATED APPLICATIONS

The present application is a National Stage Application under 35 U.S.C. § 371 of International Patent Application No. PCT/EP2022/065145 filed on Jun. 3, 2022, and claims priority from United Kingdom Application No. 2108489.2 filed on Jun. 16, 2021, in the Intellectual Property Office, the disclosures of which are herein incorporated by reference in their entireties.

TECHNICAL FIELD

The present subject matter is generally related to the field of cryptography, more particularly, but not exclusively, to a method and a system for retrieving public (cryptographic) keys in a memory constrained system.

BACKGROUND

A secure communication in an in-vehicle network highly depends on how cryptographic keys are stored, especially in the case of secure software updates, which need verification before updating from a (backend) server. For instance, cryptographic keys for secure on-board communication are typically stored in Hardware Security Module (HSM). However, if these cryptographic keys are public (cryptographic) keys used for verification, then these cryptographic keys need to be updated time to time. Usually, the public (cryptographic) keys must be updated frequently to prevent unexpected "Key Expired" situation. To perform updates on public (cryptographic) keys are quite costly and cumbersome due to extra operations that involves generation of public keys, making public key exchanges, and the like. Furthermore, storing public (cryptographic) keys require large amount of memory space, which may not be feasible.

For instance, U.S. Pat. No. 7,248,692 B2 provides a method and apparatus for determining key pair (i.e., public-private key pair) and for generating Rivest Shamir Adleman (RSA) keys. This prior art discusses method to improve security of RSA cryptosystem using longer prime numbers and limiting the computation time. However, this prior art fails to address the issue of storage space required for storing the key pairs.

The information disclosed in this background of the disclosure section is for enhancement of understanding of the general background of the invention and should not be taken as an acknowledgement or any form of suggestion that this information forms the prior art already known to a person skilled in the art.

SUMMARY

In an embodiment, the present disclosure relates to a method for retrieving public keys in a memory constrained system. The method includes generating a plurality of public cryptographic keys and private cryptographic keys using a cryptographic technique and characterizing each of the plurality of public cryptographic keys and corresponding private cryptographic keys into an associated first cryptographic component and a second cryptographic component. Thereafter, the method comprising creating at least one relationship matrix comprising the first cryptographic component of each of the plurality of public cryptographic keys and corresponding private cryptographic keys. The at least one relationship matrix is created for each of the second cryptographic component of the private cryptographic keys based on predetermined rules. Subsequently, the method comprising receiving a first cryptographic component and a second cryptographic component of a private cryptographic key from a cryptographic system associated with an ECU of the vehicle when a public cryptographic key is required. Lastly, the method comprising retrieving the public cryptographic key based on the first cryptographic component and the second cryptographic component of the private cryptographic key using the relationship matrix corresponding to the second cryptographic component of the private cryptographic key and the predetermined rules, thereby, minimizing memory required for storing the plurality of public cryptographic keys and private cryptographic keys.

In an embodiment, the present disclosure relates to a system for retrieving public keys in a memory constrained system. The system includes a cryptographic system and an Electronic Control Unit (ECU) of a vehicle. The cryptographic system comprising a processor and a memory communicatively coupled to the processor, wherein the memory stores processor-executable instructions, which on execution, cause the processor to generate a plurality of public cryptographic keys and private cryptographic keys using a cryptographic technique and characterize each of the plurality of public cryptographic keys and corresponding private cryptographic keys into an associated first cryptographic component and a second cryptographic component. Thereafter, the cryptographic system is configured to create at least one relationship matrix comprising the first cryptographic component of each of the plurality of public cryptographic keys and corresponding private cryptographic keys. The at least one relationship matrix is created for each of the second cryptographic component of the private cryptographic keys based on predetermined rules. In the subsequent step, the ECU of the vehicle is configured to receive a first cryptographic component and a second cryptographic component of a private cryptographic key from the cryptographic system associated with the ECU of the vehicle when a public cryptographic key is required. Lastly, the cryptographic system is configured to retrieve the public cryptographic key based on the first cryptographic component and the second cryptographic component of the private cryptographic key using the relationship matrix corresponding to the second cryptographic component of the private cryptographic key and the predetermined rules, thereby, minimizing memory required for storing the plurality of public cryptographic keys and private cryptographic keys.

Embodiments of the disclosure according to the above-described method and system may bring about several advantages.

In present disclosure, a relationship matrix comprising one or more of the first cryptographic component for each of the plurality of public cryptographic keys and corresponding private cryptographic keys is stored in an Electronic Control Unit of a vehicle. Since the present disclosure makes use of the relationship between private cryptographic key and public cryptographic key, storage size required for the relationship matrix is small.

Furthermore, the relationship matrix involves simple mapping logic to re-generate public cryptographic keys from private cryptographic keys.

Due to small storage size for relationship matrix and a simple mapping logic to re-generate public cryptographic keys from private cryptographic keys, the cost of updating public cryptographic keys from time to time as a requirement for any application based on cryptographic system is reduced significantly.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

DETAILED DESCRIPTION

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure provide a solution for generating, storing and retrieving public keys in a memory constrained system. In the present disclosure, the memory constrained system may refer, but not limited, to the Electronic Control Unit (ECU) of a vehicle. However, the memory constrained system may be applicable to a system involved in applications from the field of embedded security and cyber security. The present disclosure reveals a method to create/generate at least one relationship matrix comprising mapping between components of public cryptographic keys and corresponding private cryptographic keys. The generated/created relationship matrix is then stored in an ECU of a vehicle. The stored relationship matrix in the ECU of the vehicle is used to retrieve correct corresponding public cryptographic key by knowing only some parts of private cryptographic key received from a cryptographic system associated with the vehicle. The technical advantage of the present disclosure is three-fold: (1) reduces storage size significantly as components of public cryptographic keys and corresponding private cryptographic keys are stored in the form of (relationship) matrix, (2) provides a simple mapping logic to re-generate/retrieve public cryptographic keys from the components of private cryptographic keys, and (3) reduces the cost significantly of updating public cryptographic keys from time to time as a requirement.

Figure 1A:
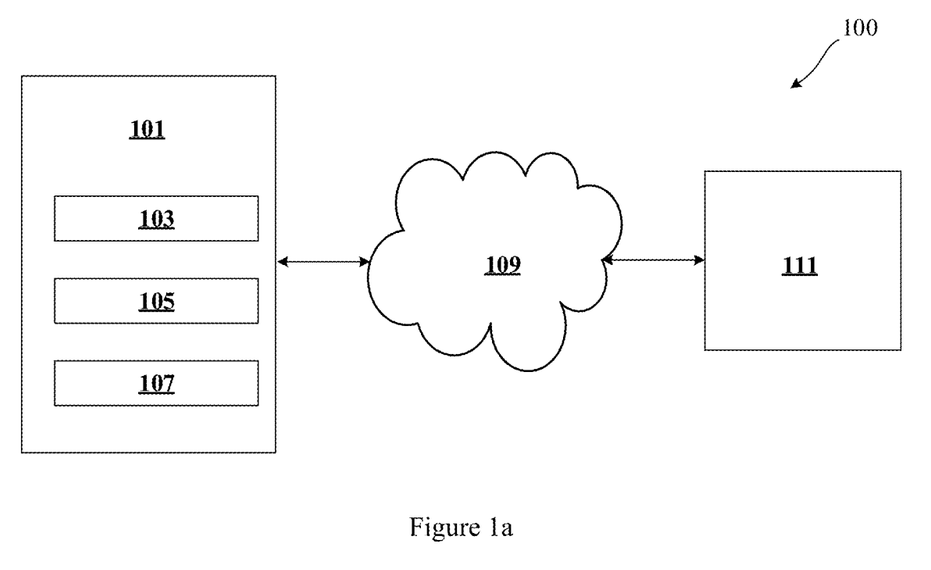
FIG. 1a illustrates an exemplary environment for generating, storing and retrieving public keys in a memory constrained system in accordance with some embodiments of the present disclosure.

FIG. 1a illustrates an exemplary environment for generating, storing and retrieving public keys in a memory constrained system in accordance with some embodiments of the present disclosure.

As shown in the FIG. 1a, the system 100 includes a cryptographic system 101, a communication network 109 and an ECU 111 of a vehicle (hereinafter referred as ECU 111). The cryptographic system 101 may be present on a local server or on a cloud server. The cryptographic system

101 may create at least one relationship matrix comprising first cryptographic component of each of a plurality of public cryptographic keys and corresponding private cryptographic keys using a plurality of public cryptographic keys and private cryptographic keys. In brief, the relationship matrix contains mapping of first cryptographic component of each of a plurality of public cryptographic keys with corresponding private cryptographic keys based on predetermined rules (creation of relationship matrix is described later). Furthermore, the cryptographic system 101 may update stored at least one relationship matrix with at least one new relationship matrix in the ECU 111 of the vehicle when a change in a public cryptographic key is required. The cryptographic system 101 may store and/or update the relationship matrix in the ECU 111 through the communication network 109. In one embodiment, there may be a plurality of ECUs 111 instead of a single ECU 111 (not shown in FIG. 1*a*). Each ECU 111 may be associated with a single vehicle. The communication network 109 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi, Bluetooth and the like.

In the embodiment, the cryptographic system 101 may use a plurality of public cryptographic keys and private cryptographic keys to create at least one relationship matrix comprising first cryptographic component for each of the plurality of public cryptographic keys and corresponding private cryptographic keys based on predetermined rules (discussed later in the section). The cryptographic system 101 may include an I/O interface 103, a memory 105 and a processor 107. The I/O interface 103 may be configured to communicate with the ECU 111. The I/O interface 103 may employ communication protocols/methods such as, without limitation, audio, analog, digital, monoaural, Radio Corporation of America (RCA) connector, stereo, IEEE®-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI®), Radio Frequency (RF) antennas, S-Video, Video Graphics Array (VGA), IEEE® 802.11b/g/n/x, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

The relationship matrix created by the cryptographic system 101 may be stored in the memory 105. The memory 105 may be communicatively coupled to the processor 107 of the cryptographic system 101. The memory 105 may, also, store processor instructions which may cause the processor 107 to execute the instructions for generating and storing public keys in a memory constrained system. The memory 105 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 107 may include at least one data processor for generating and storing public keys in a memory constrained system. The processor 107 may include specialized processing units such as integrated system (bus) controllers, memory management control units, floating point units, graphics processing units, digital signal processing units, etc.

In the embodiment, the cryptographic system 101 may store and/or update the at least one relationship matrix in the ECU 111 through the communication network 109. The ECU 111 may be any embedded electronic device. The ECU 111 may be populated or stored with the at least one relationship matrix that includes first cryptographic component of each of the plurality of public cryptographic keys and corresponding private cryptographic keys created based on predetermined rules. The stored at least one relationship matrix in the ECU 111 may be updated by the cryptographic system 101 with a new relationship matrix in the ECU 111 when a change in a public cryptographic key is required.

Hereafter, the operation of the cryptographic system 101 for generating and storing public cryptographic keys in a memory constrained system is described.

Figure 1B:
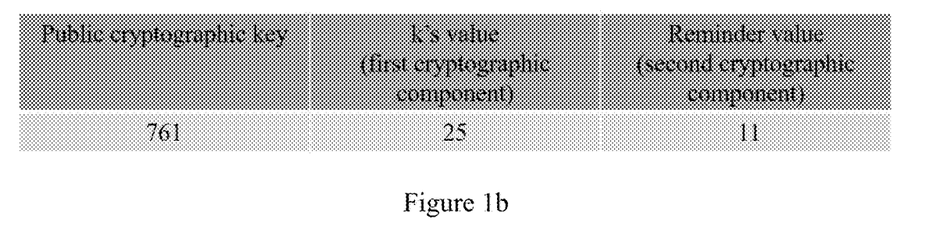
FIG. 1b illustrates an example of a public cryptographic key characterized into the associated first cryptographic component (k's value) and the second cryptographic component (reminder value) in accordance with some embodiments of the present disclosure.

The cryptographic system 101 generates a plurality of public cryptographic keys and private cryptographic keys using a cryptographic technique. As an example, the cryptographic technique used for generating the plurality of public cryptographic keys and private cryptographic keys is a Rivest Shamir Adleman (RSA) technique. Alternatively, the cryptographic technique used for generating the plurality of public cryptographic keys and private cryptographic keys may be Elliptic-Curve Cryptography (ECC) technique or modular exponentiation-based on logarithm technique. According to the requirements of RSA technique, the plurality of public cryptographic keys and private cryptographic keys must be prime numbers. Each of the plurality of public cryptographic keys and private cryptographic keys is characterized into an associated first cryptographic component and a second cryptographic component by the cryptographic system 101. In detail, the first cryptographic component is a multiple of 30, and the second cryptographic component is a reminder of each of the plurality of public cryptographic keys and private cryptographic keys modulus 30. For instance, each of public cryptographic keys and private cryptographic keys, which are prime numbers, is expressed as $30*k\pm1$, $30*k\pm7$, $30*k\pm11$, or $30*k\pm13$. Here, $k \in (0, 1, 2, 3 \ldots n)$. In the present disclosure, the term 'k' is referred as the first cryptographic component and the reminder i.e., $\pm1$, $+7$, $\pm11$, or $\pm13$ is referred as the second cryptographic component. An example of a public cryptographic key into the associated first cryptographic component (k's value) and the second cryptographic component (reminder value) is shown in FIG. 1*b*. Analogously, a private cryptographic key into the associated first cryptographic component (k's value) and the second cryptographic component (reminder value) is expressed. According to the RSA technique, the generation of the public cryptographic keys and private cryptographic keys are as follows:

Choose two different large random prime numbers 'p' and 'q'.

Calculate n=p*q. Here n is the modulus for the public cryptographic key and the private cryptographic key.

$$\text{Calculate the totient } \varphi(n) = (p-1)*(q-1).$$

Choose an integer 'e' such that $1<e<\varphi(n)$, and 'e' is co-prime to $\varphi(n)$. For example, 'e' and $\varphi(n)$ share no factors other than 1 i.e., GCD of $(e, \varphi(n))=1$. Here, 'e' is released as the public key exponent.

Compute 'd' to satisfy the congruence relation $d*e=1 \pmod{\varphi(n)}$. For example, $d*e=1+k*\varphi(n)$ for some integer 'm' i.e., for instance, if (d*e) equals $(1+m*\varphi(n))$, then the value of m is decided. Thereafter, calculate d=(1+m*φ(n))/e. Here, 'd' is kept as the private key exponent.

An example based on the above-mentioned steps is shown below.

Choosing two random prime numbers i.e., p=61 and q=53.

Computing n=p*q i.e., n=61*53=3233.

Computing the totient φ(n)=(p−1)*(q−1) i.e., φ(n)=(61−1)*(53−1)=3120.

Choosing 'e' such that 1<e<3120 and 'e' is co-prime to 3120.

Figure 1C:
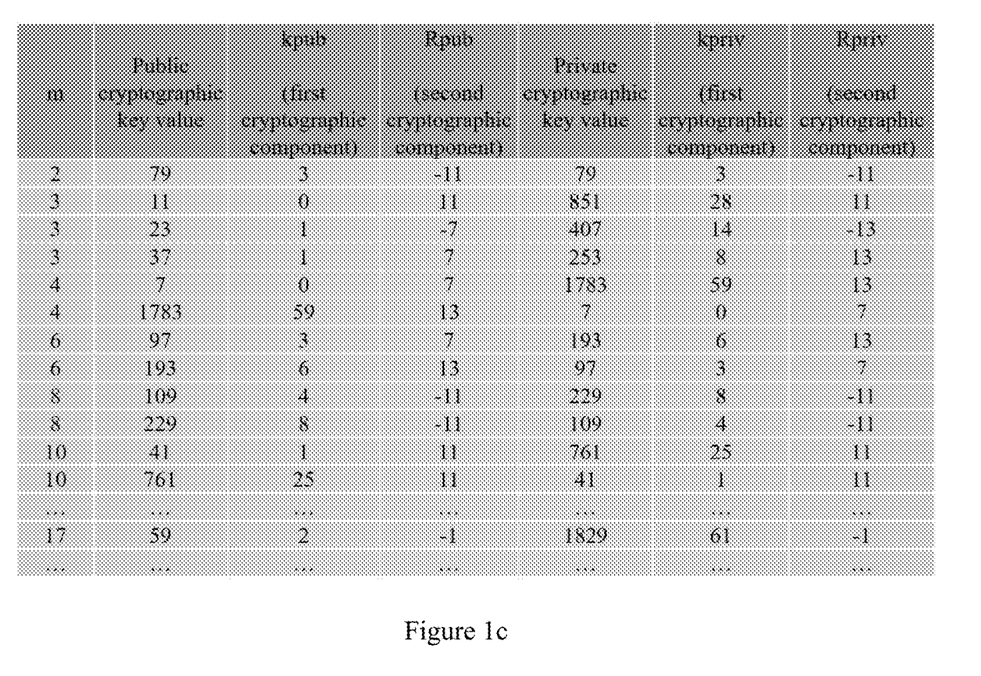
FIG. 1c illustrates a plurality of public cryptographic key values and its corresponding private cryptographic key values characterized into their respective first cryptographic component and the second cryptographic component in accordance with some embodiments of the present disclosure.

Based on the above-mentioned steps according to the RSA technique, the plurality of public cryptographic keys and private cryptographic keys are generated as shown in FIG. 1c. FIG. 1c shows a plurality of public cryptographic key values and corresponding private cryptographic key values characterized into their respective first cryptographic component and the second cryptographic component. The different prime numbers 'p' and 'q' generate different pairs of private cryptographic key and public cryptographic key. Each of the public cryptographic key value and the private cryptographic key value is expressed into an associated first cryptographic component (where kpub is k's value for a public cryptographic key and kpriv is k's value for a private cryptographic key) and a second cryptographic component (where Rpub is a reminder value for a public cryptographic key and Rpriv is a reminder value for a private cryptographic key) by the cryptographic system 101. Thereafter, the cryptographic system 101 identifies one or more the first cryptographic component for each of the plurality of public cryptographic keys and private cryptographic keys based on the second cryptographic component of each of the plurality of private cryptographic keys.

Figure 1D:
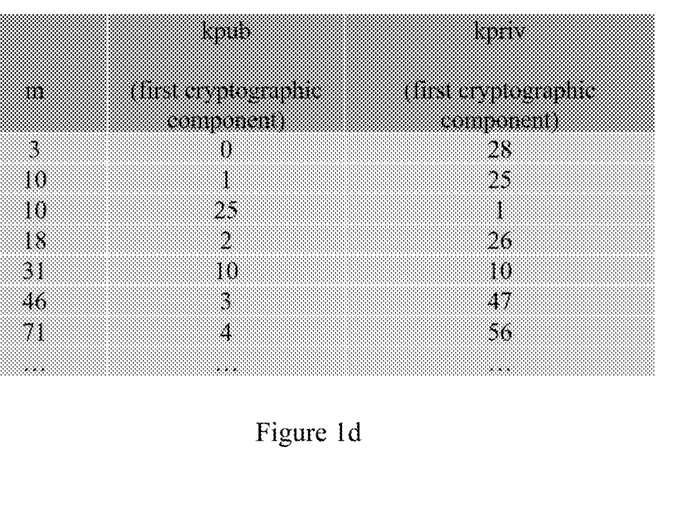
FIG. 1d illustrates an example of a relationship matrix created by a cryptographic system in accordance with some embodiments of the present disclosure.

For instance, for the public cryptographic key value of 79, the first cryptographic component is 3 and the second cryptographic component value is −11. Analogously, for the private cryptographic key value of 79, the first cryptographic component is 3 and the second cryptographic component value is −11. Based on the second cryptographic component of the private cryptographic key i.e., −11, the cryptographic system 101 identifies the public cryptographic key value i.e., 79 and its components (the first cryptographic component i.e., 3 and the second cryptographic component i.e., −11) with the private cryptographic key value i.e., 79 and its components (the first cryptographic component i.e., 3 and the second cryptographic component i.e., −11). Similarly, based on the second cryptographic component of the private cryptographic key i.e., −13, the cryptographic system 101 identifies the public cryptographic key value i.e., 23 and its components (the first cryptographic component i.e., 1 and the second cryptographic component i.e., −7) with the private cryptographic key value i.e., 407 and its components (the first cryptographic component i.e., 14 and the second cryptographic component i.e., −13). Subsequently, the cryptographic system 101 creates at least one relationship matrix comprising the first cryptographic component of each of the plurality of public cryptographic keys and corresponding private cryptographic keys. The at least one relationship matrix is created for each of the second cryptographic component of the private cryptographic keys based on predetermined rules. The predetermined rules comprise of (1) if the second cryptographic component (Rpriv) of a private cryptographic key is +11 or −11, then the second cryptographic component (Rpub) of a public cryptographic key is +11 or −11 respectively, (2) if the second cryptographic component (Rpriv) of the private cryptographic key is −1, then the second cryptographic component (Rpub) of the public cryptographic key is −1, (3) if the second cryptographic component (Rpriv) of the private cryptographic key is +7 or −7, then the second cryptographic component (Rpub) of the public cryptographic key is +13 or −13 respectively, and (4) if the second cryptographic component (Rpriv) of the private cryptographic key is +13 or −13, then the second cryptographic component (Rpub) of the public cryptographic key is +7 or −7 respectively. Based on the above-mentioned predetermined rules, an example of a relationship matrix created by the cryptographic system 101 for the rule if the second cryptographic component (Rpriv) of a private cryptographic key is +11, then the second cryptographic component (Rpub) of a public cryptographic key is +11 is shown in FIG. 1d. Analogously, the cryptographic system 101 creates a relationship matrix for each of the second cryptographic component (Rpriv) of the private cryptographic key equaling to "−1", "±7" and "±13". After creating the relationship matrix, the cryptographic system 101 stores the created relationship matrix in the ECU 111.

Hereafter, the operation of the ECU 111 for retrieving public cryptographic is described. One example for which retrieval of public cryptographic is performed is when software associated with the ECU 111 requires an update.

The ECU 111 checks whether usage of a public cryptographic key is required or change in a public cryptographic key is required. When the usage of the public cryptographic key is required, the ECU 111 receives a first cryptographic component (kpriv) and a second cryptographic component (Rpriv) of a private cryptographic key from the cryptographic system 101 associated with the ECU 111. Thereafter, the ECU 111 retrieves the public cryptographic key based on the first cryptographic component and the second cryptographic component of the private cryptographic key using the relationship matrix corresponding to the second cryptographic component of the private cryptographic key and the predetermined rules. For instance, suppose the ECU 111 receives a first cryptographic component (kpriv) as 25 and corresponding second cryptographic component (Rpriv) as 11 of a private cryptographic key. Using the stored relationship matrix shown in FIG. 1d for the second cryptographic component (Rpriv) of a private cryptographic key +11, the ECU 111 determines corresponding the first cryptographic component (kpub), which in this case is 1. In this case, the ECU 111 uses first predetermined rule to determine the second cryptographic component (Rpub) of the public cryptographic key i.e., if the second cryptographic component (Rpriv) of a private cryptographic key is +11 or −11, then the second cryptographic component (Rpub) of a public cryptographic key is +11 or −11 respectively. The ECU 111 retrieves the public cryptographic key using the expression 30k+11, which gives the public cryptographic key value as 41. When the change in a public cryptographic key is required, the ECU 111 receives at least one new relationship matrix from the cryptographic system 101 associated with the ECU 111. Thereafter, the ECU 111 updates the stored at least one relationship matrix with the at least new relationship matrix in the ECU 111.

Figure 2:
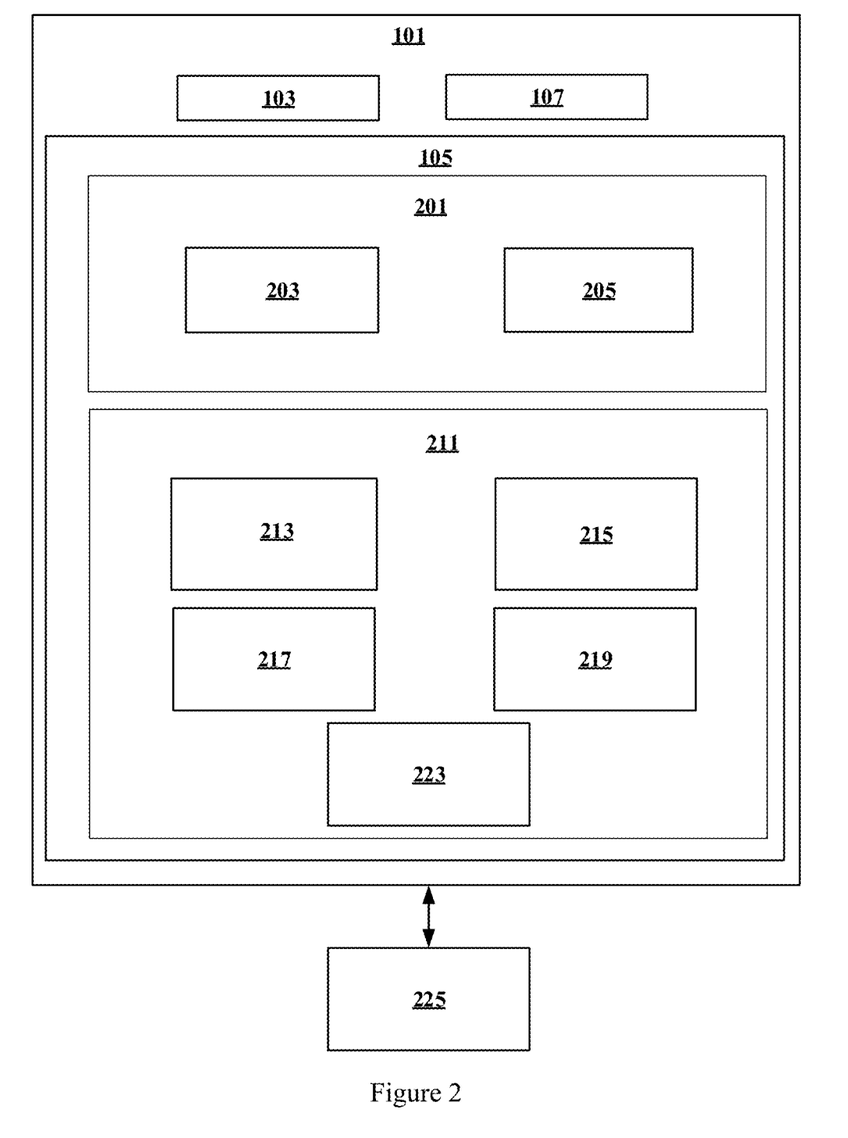
FIG. 2 shows a detailed block diagram of a system in accordance with some embodiments of the present disclosure.

FIG. 2 shows a detailed block diagram of a system in accordance with some embodiments of the present disclosure.

The system 100 comprises of the cryptographic system 101 and the ECU 225 wherein the cryptographic system 101 is associated with the ECU 225. The ECU 225 may, also, be referred as the ECU 111 shown in FIG. 1a.

The cryptographic system 101, in addition to the I/O interface 103 and the processor 107 described above, may include data 201 and one or more modules 211, which are described herein in detail. In the embodiment, the data 201 may be stored within the memory 105. The data 201 may include, for example, relationship matrix data 203 and other data 205.

The relationship matrix data 203 may include at least one relationship matrix created by the cryptographic system 101. For instance, the relationship matrix shown in FIG. 1*d* may be stored in the relationship matrix data 203. Similarly, a relationship matrix for each of the second cryptographic component equaling to "−11", "−1", "±7" and "±13" may be stored in the relationship matrix data 203.

The other data 205 may store data, including temporary data and temporary files, generated by one or more modules 211 for performing the various functions of the cryptographic system 101.

In the embodiment, the data 201 in the memory 105 are processed by the one or more modules 211 present within the memory 105 of the cryptographic system 101. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 may be communicatively coupled to the processor 205 for performing one or more functions of the cryptographic system 101. The said modules 211 when configured with the functionality defined in the present disclosure will result in a novel hardware.

In one implementation, the one or more modules 211 may include, but are not limited to, a generating module 213, a characterizing module 215, an identifying module 217, and a creating module 219. The one or more modules 211 may, also, include other modules 223 to perform various miscellaneous functionalities of the cryptographic system 101.

The generating module 213 may generate a plurality of public cryptographic keys and private cryptographic keys using a cryptographic technique. The cryptographic technique may be a Rivest Shamir Adleman (RSA) technique. The plurality of public cryptographic keys and private cryptographic keys may be different prime numbers.

The characterizing module 215 may characterize each of the plurality of public cryptographic keys and corresponding private cryptographic keys into an associated first cryptographic component and a second cryptographic component. The first cryptographic component may a multiple of 30, and the second cryptographic component may be a reminder of each of the plurality of public cryptographic keys and private cryptographic keys modulus 30. For instance, each of public cryptographic keys and private cryptographic keys, which are different prime numbers, may be expressed as 30*k±1, 30*k±7, 30*k±11, or 30*k±13. Here, k∈(0, 1, 2, 3 . . . n). Here, the term 'k' may be referred as the first cryptographic component and the reminder i.e., ±1, ±7, ±11, or ±13 may be referred as the second cryptographic component. An example of a public cryptographic key into the associated first cryptographic component (k's value) and the second cryptographic component (reminder value) is shown in FIG. 1*b*. Similarly, a private cryptographic key into the associated first cryptographic component (k's value) and the second cryptographic component (reminder value) may be expressed. The plurality of public cryptographic key values and its corresponding private cryptographic key values characterized into their respective first cryptographic component and the second cryptographic component is shown in FIG. 1*c*.

The identifying module 217 may identify one or more the first cryptographic component for each of the plurality of public cryptographic keys and private cryptographic keys based on the second cryptographic component of each of the plurality of private cryptographic keys. For example, with reference to FIG. 1*c*, for the public cryptographic key value of 79, the first cryptographic component is 3 and the second cryptographic component value is −11. Analogously, for the private cryptographic key value of 79, the first cryptographic component is 3 and the second cryptographic component value is −11. Based on the second cryptographic component of the private cryptographic key i.e., −11, the identifying module 217 of the cryptographic system 101 may identify the public cryptographic key value i.e., 79 and its components (the first cryptographic component i.e., 3 and the second cryptographic component i.e., −11) with the private cryptographic key value i.e., 79 and its components (the first cryptographic component i.e., 3 and the second cryptographic component i.e., −11) and sort the public cryptographic key value i.e., 79 and the private cryptographic key value i.e., 79 based on common second cryptographic component i.e., −11.

The creating module 219 may create at least one relationship matrix comprising first cryptographic component of each of the plurality of public cryptographic keys and corresponding private cryptographic keys based on predetermined rules. An example of the relationship matrix created by the creating module 219 of the cryptographic system 101 for the rule if the second cryptographic component (Rpriv) of a private cryptographic key is ±11, then the second cryptographic component (Rpub) of a public cryptographic key is ±11 is shown in FIG. 1*d*. Thereafter, the creating module 219 may store the created relationship matrix in the ECU 225.

The ECU 225 may check whether usage of a public cryptographic key is required or change in a public cryptographic key is required. When the usage of a public cryptographic key is required, the ECU 225 may receive a first cryptographic component and a second cryptographic component of a private cryptographic key from the cryptographic system 101 associated with the ECU 225. For instance, with reference to the FIG. 1*d*, suppose the ECU 225 receives a first cryptographic component (kpriv) as 25 and corresponding second cryptographic component (Rpriv) as 11 of a private cryptographic key. Using the stored relationship matrix shown in FIG. 1*d* for the second cryptographic component (Rpriv) of a private cryptographic key +11, the ECU 225 determines corresponding the first cryptographic component (kpub), which in this case is 1. Thereafter, the ECU 225 may retrieve the public cryptographic key based on the first cryptographic component and the second cryptographic component of the private cryptographic key using the relationship matrix corresponding to the second cryptographic component of the private cryptographic key and the predetermined rules. For instance, the ECU 225 retrieves the public cryptographic key using the expression 30*k±11, which gives the public cryptographic key value as 41. When the change in a public cryptographic key is required the ECU 225 may receive at least one new relationship matrix from the cryptographic system 101 associated with the ECU 225. Subsequently, the ECU 225 may update the stored at least one relationship matrix with the at least one new relationship matrix in the ECU 225.

Figure 3:
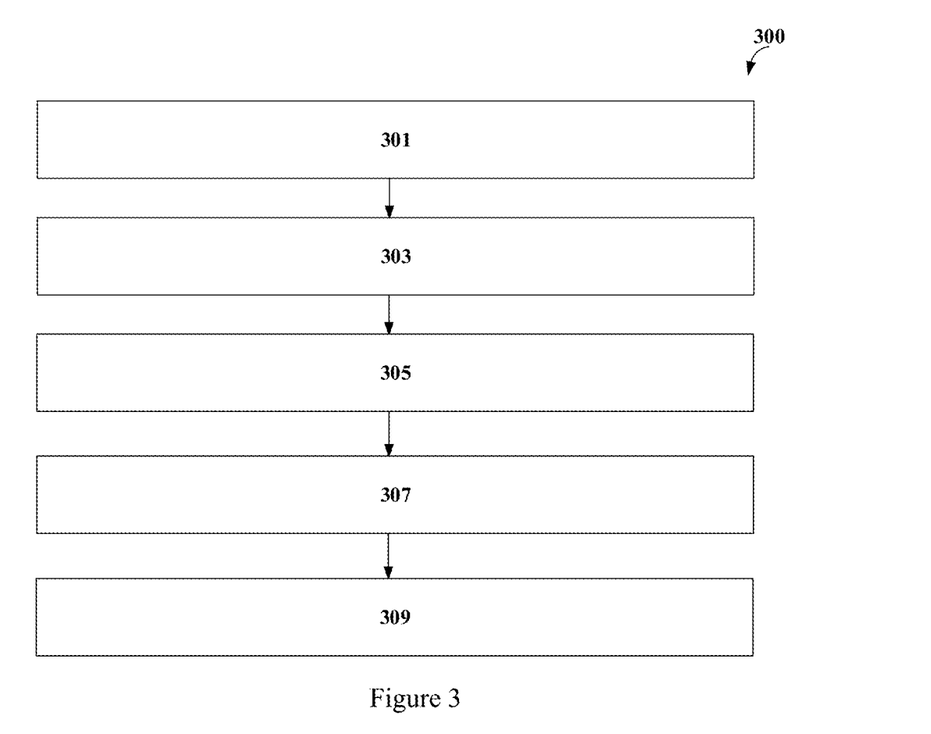
FIG. 3 illustrates a flowchart showing a method for retrieving public keys in a memory constrained system in accordance with some embodiments of present disclosure.

FIG. 3 illustrates a flowchart showing a method for retrieving public keys in a memory constrained system in accordance with some embodiments of present disclosure.

As illustrated in FIG. 3, the method 300 includes one or more blocks for retrieving public keys in a memory constrained system. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the generating module 213 may generate a plurality of public cryptographic keys and private cryptographic keys using a cryptographic technique. The cryptographic technique may be a Rivest Shamir Adleman (RSA) technique. The plurality of public cryptographic keys and private cryptographic keys may be prime numbers.

At block 303, the characterizing module 215 may characterize each of the plurality of public cryptographic keys and corresponding private cryptographic keys into an associated first cryptographic component and a second cryptographic component. The first cryptographic component may be a multiple of 30. The second cryptographic component may be a reminder of each of the plurality of public cryptographic keys and private cryptographic keys modulus 30.

At block 305, the creating module 219 may create at least one relationship matrix comprising the first cryptographic component of each of the plurality of public cryptographic keys and corresponding private cryptographic keys. The at least one relationship matrix is created for each of the second cryptographic component of the private cryptographic keys based on predetermined rules. The predetermined rules may comprise of (1) if the second cryptographic component of a private cryptographic key is +11 or −11, then the second cryptographic component of a public cryptographic key is +11 or −11 respectively, (2) if the second cryptographic component of the private cryptographic key is −1, then the second cryptographic component of the public cryptographic key is −1, (3) if the second cryptographic component of the private cryptographic key is +7 or −7, then the second cryptographic component of the public cryptographic key is +13 or −13 respectively, and (4) if the second cryptographic component of the private cryptographic key is +13 or −13, then the second cryptographic component of the public cryptographic key is +7 or −7 respectively.

At block 307, the ECU 225 of the vehicle associated with the cryptographic system 101 may receive a first cryptographic component and a second cryptographic component of a private cryptographic key from the cryptographic system 101 associated with the ECU 225 of the vehicle when the usage of a public cryptographic key is required.

At block 309, the ECU 225 of the vehicle may retrieve the public cryptographic key based on the first cryptographic component and the second cryptographic component of the private cryptographic key using the relationship matrix corresponding to the second cryptographic component of the private cryptographic key and the predetermined rules.

Some of the technical advantages of the present disclosure are listed below.

In present disclosure, a relationship matrix comprising one or more of the first cryptographic component for each of the plurality of public cryptographic keys and corresponding private cryptographic keys is stored in an Electronic Control Unit of a vehicle. Since the present disclosure makes use of the relationship between private cryptographic key and public cryptographic key, storage size required for the relationship matrix is small.

Furthermore, the relationship matrix involves simple mapping logic to re-generate public cryptographic keys from private cryptographic keys.

Due to small storage size for relationship matrix and a simple mapping logic to re-generate public cryptographic keys from private cryptographic keys, the cost of updating public cryptographic keys from time to time as a requirement for any application based on cryptographic system is reduced significantly.

Figure 4:
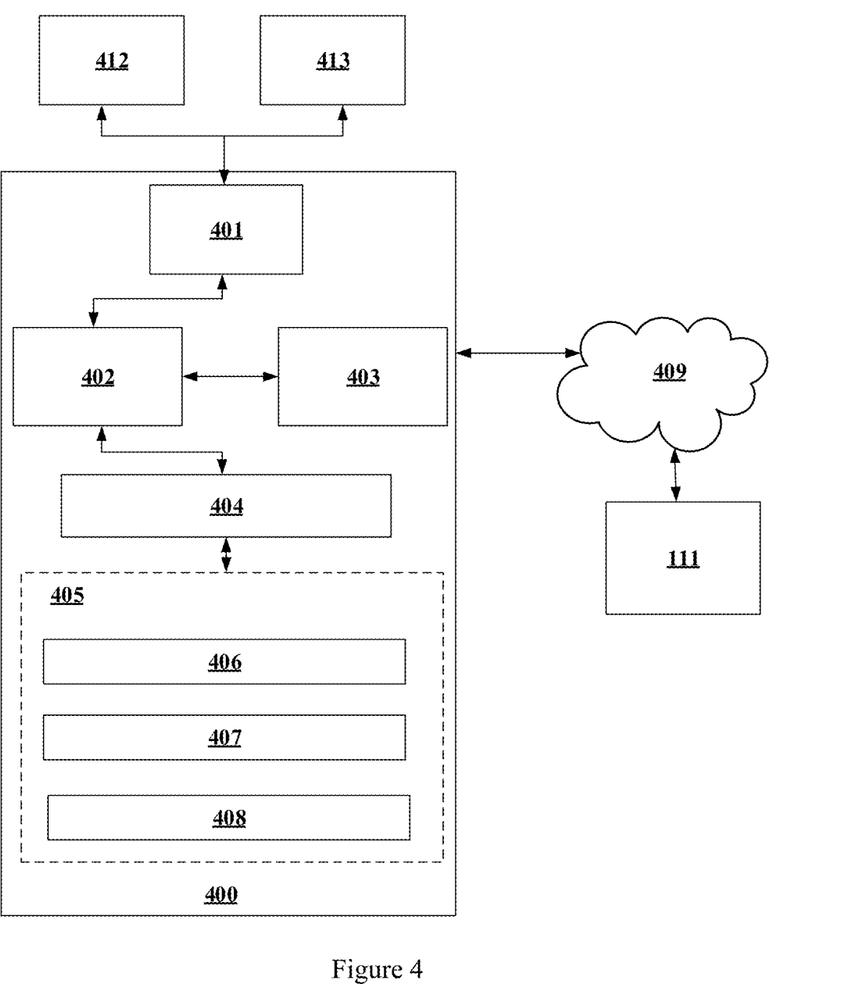
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be used to implement the cryptographic system 101. The computer system 400 may include a central processing unit ("CPU" or "processor") 402. The processor 402 may include at least one data processor for generating, storing and retrieving public keys in a memory constrained system. The processor 402 may include specialized processing units such as, integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 employ communication protocols/methods such as, without limitation, audio, analog, digital, monoaural, Radio Corporation of America (RCA) connector, stereo, IEEE®-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI®), Radio Frequency (RF) antennas, S-Video, Video Graphics Array (VGA), IEEE® 802.11b/g/n/x, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

Using the I/O interface 401, the computer system 400 may communicate with one or more I/O devices such as input devices 412 and output devices 413. For example, the input devices 412 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 413 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 400 consists of the cryptographic system 101. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. The communication network 409 may include, without limitation, a direct interconnection, Local Area Network (LAN), Wide Area Network (WAN), wireless network (e.g., using Wireless Application Protocol), the Internet, etc. Using the network interface 403 and the communication network 409, the computer system 400 may communicate with an ECU 111 of a vehicle. The network interface 403 may employ connection protocols include, but not limited to, direct connect, Ethernet (e.g., twisted pair 10/100/1000 Base T), Transmission Control Protocol/Internet Protocol (TCP/IP), token ring, IEEE® 802.11a/b/g/n/x, etc.

The communication network 409 includes, but is not limited to, a direct interconnection, a Peer to Peer (P2P) network, Local Area Network (LAN), Wide Area Network (WAN), wireless network (e.g., using Wireless Application Protocol), the Internet, Wi-Fi and such.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, Serial Advanced Technology Attachment (SATA), Integrated Drive Electronics (IDE), IEEE®-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, etc. In some embodiments, computer system 400 may store user/application data, such as, the data, variables, records, etc., as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX DISTRIBUTIONS (E.G., RED HAT®, UBUNTUR, KUBUNTUR, etc.), IBMROS/2R, MICROSOFT® WINDOWS® (XPR, VISTA®/7/8, 10 etc.), APPLE® IOS®, GOOGLE™ ANDROID™ BLACKBERRY® OS, or the like.

In some embodiments, the computer system 400 may implement web browser 408 stored program components. Web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH® JAVASCRIPT®, JAVA®, Application Programming Interfaces (APIs), etc. The computer system 400 may implement a mail server (not shown in FIG. 4) stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The computer system 400 may implement a mail client (not shown in FIG. 4) stored program component. The mail client may be a mail viewing application, such as APPLE® MAIL, MICROSOFT® ENTOURAGE® MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | System |
| 101 | Cryptographic system |
| 103 | I/O interface |
| 105 | Memory |
| 107 | Processor |
| 109 | Communication network |
| 111, 225 | Electronic Control Unit (ECU) of a vehicle |
| 201 | Data |
| 203 | Relationship matrix data |
| 205 | Other data |
| 211 | Modules |
| 213 | Generating module |
| 215 | Characterizing module |
| 217 | Identifying module |
| 219 | Creating module |
| 223 | Other modules |
| 400 | Computer system |
| 401 | I/O interface |
| 402 | Processor |
| 403 | Network interface |
| 404 | Storage interface |
| 405 | Memory |
| 406 | User interface |

-continued

REFERRAL NUMERALS:

| Reference number | Description |
| --- | --- |
| 407 | Operating system |
| 408 | Web browser |
| 409 | Communication network |
| 412 | Input devices |
| 413 | Output devices |

We claim:

1. A method for retrieving public cryptographic keys in a memory constrained system, the method comprising:
generating, by a cryptographic system, a plurality of public cryptographic keys and private cryptographic keys using a cryptographic technique;
characterizing, by the cryptographic system, each of the plurality of public cryptographic keys and corresponding private cryptographic keys into an associated first cryptographic component and a second cryptographic component;
creating, by the cryptographic system, at least one relationship matrix comprising the first cryptographic component of each of the plurality of public cryptographic keys and corresponding private cryptographic keys, wherein the at least one relationship matrix is created for each of the second cryptographic component of the private cryptographic keys based on predetermined rules;
receiving, by an Electronic Control Unit (ECU) of a vehicle associated with the cryptographic system, a first cryptographic component and a second cryptographic component of a private cryptographic key from the cryptographic system when a public cryptographic key is required; and
retrieving, by the ECU of the vehicle, the public cryptographic key based on the first cryptographic component and the second cryptographic component of the private cryptographic key using the relationship matrix corresponding to the second cryptographic component of the private cryptographic key and the predetermined rules, thereby, minimizing memory required for storing the plurality of public cryptographic keys and private cryptographic keys.

2. The method as claimed in claim 1, wherein the cryptographic technique is a Rivest Shamir Adleman (RSA) technique.

3. The method as claimed in claim 1, wherein the first cryptographic component is a multiple of 30, and
wherein the second cryptographic component is a reminder of each of the plurality of public cryptographic keys and private cryptographic keys modulus 30.

4. The method as claimed in claim 1, wherein the plurality of public cryptographic keys and private cryptographic keys are different prime numbers.

5. The method as claimed in claim 1, wherein the predetermined rules comprise:
if the second cryptographic component of a private cryptographic key is +11 or −11, then the second cryptographic component of a public cryptographic key is +11 or −11;
if the second cryptographic component of the private cryptographic key is −1, then the second cryptographic component of the public cryptographic key is −1;

if the second cryptographic component of the private cryptographic key is +7 or −7, then the second cryptographic component of the public cryptographic key is +13 or −13; and if the second cryptographic component of the private cryptographic key is +13 or −13, then the second cryptographic component of the public cryptographic key is +7 or −7.

6. The method as claimed in claim 1 further comprising: storing, by the cryptographic system, the at least one relationship matrix in the ECU of the vehicle.

7. The method as claimed in claim 6 further comprising: updating, by the cryptographic system, the stored at least one relationship matrix with at least one new relationship matrix in the ECU of the vehicle when a change in a public cryptographic key is required.

8. A system for retrieving public cryptographic keys in a memory constrained system, the system comprising:
a cryptographic system comprising:
  a processor; and
  a memory communicatively coupled to the processor, wherein the memory stores processor-executable instructions, which on execution, cause the processor to:
    generate a plurality of public cryptographic keys and private cryptographic keys using a cryptographic technique;
    characterize each of the plurality of public cryptographic keys and corresponding private cryptographic keys into an associated first cryptographic component and a second cryptographic component;
    create at least one relationship matrix comprising the first cryptographic component of each of the plurality of public cryptographic keys and corresponding private cryptographic keys, wherein the at least one relationship matrix is created for each of the second cryptographic component of the private cryptographic keys based on predetermined rules; and
an Electronic Control Unit (ECU) of a vehicle configured to:
  receive a first cryptographic component and a second cryptographic component of a private cryptographic key from the cryptographic system associated with the ECU of the vehicle when a public cryptographic key is required; and
  retrieve the public cryptographic key based on the first cryptographic component and the second cryptographic component of the private cryptographic key using the relationship matrix corresponding to the second cryptographic component of the private cryptographic key and the predetermined rules, thereby, minimizing memory required for storing the plurality of public cryptographic keys and private cryptographic keys.

9. The system as claimed in claim 8, wherein the cryptographic technique is a Rivest Shamir Adleman (RSA) technique.

10. The system as claimed in claim 8, wherein the first cryptographic component is a multiple of 30, and
wherein the second cryptographic component is a reminder of each of the plurality of public cryptographic keys and private cryptographic keys modulus 30.

11. The system as claimed in claim 8, wherein the plurality of public cryptographic keys and private cryptographic keys are different prime numbers.

12. The system as claimed in claim 8, wherein the predetermined rules comprise of:
if the second cryptographic component of a private cryptographic key is +11 or −11, then the second cryptographic component of a public cryptographic key is +11 or −11;

if the second cryptographic component of the private cryptographic key is −1, then the second cryptographic component of the public cryptographic key is −1;

if the second cryptographic component of the private cryptographic key is +7 or −7, then the second cryptographic component of the public cryptographic key is +13 or −13; and if the second cryptographic component of the private cryptographic key is +13 or −13, then the second cryptographic component of the public cryptographic key is +7 or −7.

13. The system as claimed in claim 8 is configured to: store the at least one relationship matrix in the ECU of the vehicle.

14. The system as claimed in claim 13 is configured to: update the stored at least one relationship matrix with at least one new relationship matrix in the ECU of the vehicle when a change in a public cryptographic key is required.

* * * * *